(12) United States Patent
Büttner et al.

(10) Patent No.: US 11,416,689 B2
(45) Date of Patent: Aug. 16, 2022

(54) SYSTEM AND METHOD FOR NATURAL LANGUAGE PROCESSING WITH A MULTINOMINAL TOPIC MODEL

(71) Applicant: Siemens Aktiengesellschaft, Munich (DE)

(72) Inventors: Florian Büttner, Munich (DE); Yatin Chaudhary, Munich (DE); Pankaj Gupta, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 66 days.

(21) Appl. No.: 16/367,444

(22) Filed: Mar. 28, 2019

(65) Prior Publication Data
US 2020/0311213 A1    Oct. 1, 2020

(51) Int. Cl.
*G06F 40/56* (2020.01)
*G06F 40/30* (2020.01)
*G06F 40/44* (2020.01)
*G06N 3/04* (2006.01)

(52) U.S. Cl.
CPC .............. *G06F 40/56* (2020.01); *G06F 40/30* (2020.01); *G06F 40/44* (2020.01); *G06N 3/0454* (2013.01)

(58) Field of Classification Search
CPC .......... G06F 40/56; G06F 40/30; G06F 40/44; G06N 3/0454

USPC ............................................................ 704/9
See application file for complete search history.

(56) References Cited

U.S. PATENT DOCUMENTS

| | | | | |
|---|---|---|---|---|
| 10,109,275 B2* | 10/2018 | Henry | ................. | G06F 40/289 |
| 10,489,792 B2* | 11/2019 | Hackman | ............... | G06N 3/084 |
| 10,497,004 B2* | 12/2019 | Shaev | ................... | G06F 40/284 |
| 10,685,050 B2* | 6/2020 | Krishna | ................. | G06N 20/00 |
| 10,733,614 B2* | 8/2020 | Sapoznik | ............... | G06F 40/35 |
| 10,740,370 B2* | 8/2020 | Campbell | ............... | G06F 40/35 |
| 10,796,107 B2* | 10/2020 | Kong | .................. | G06K 9/6232 |

(Continued)

OTHER PUBLICATIONS

Yin, Zheng, Yu-Jin Zhang, Huga Larochelle; Topic Modeling of Mutlimodal Data: an Autoregressive Approach; 2014; pp. 1-8 (Year: 2014).*

(Continued)

*Primary Examiner* — Bryan S Blankenagel
(74) *Attorney, Agent, or Firm* — Schmeiser, Olsen & Watts LLP

(57) ABSTRACT

The invention refers to a natural language processing system configured for receiving an input sequence $c_i$ of input words $(v_1, v_2, \ldots v_N)$ representing a first sequence of words in a natural language of a first text and generating an output sequence of output words $(\widehat{v_1}, \widehat{v_2}, \ldots \widehat{v_N})$ representing a second sequence of words in a natural language of a second text and modeled by a multinominal topic model, wherein the multinominal topic model is extended by an incorporation of language structures using a deep contextualized Long-Short-Term Memory model.

13 Claims, 3 Drawing Sheets

(56) References Cited

U.S. PATENT DOCUMENTS

Figure 1:
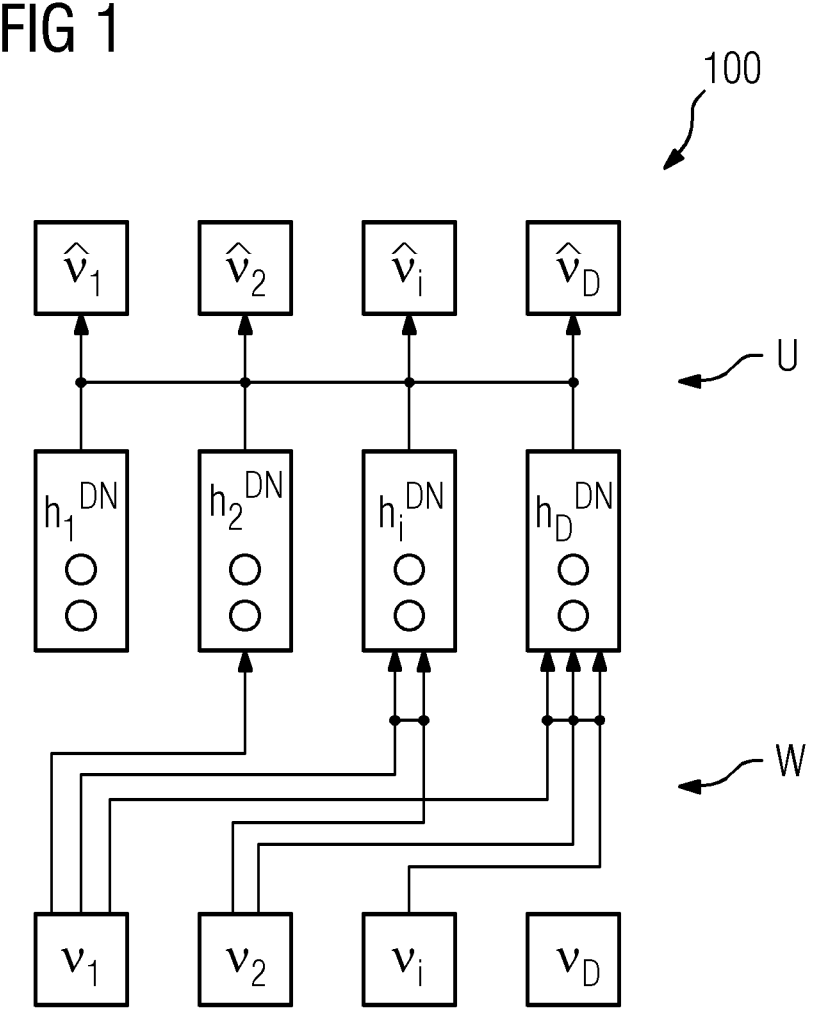

| | | | |
|---|---|---|---|
| 2015/0262069 A1* | 9/2015 | Gabriel | G06F 16/9535 |
| | | | 706/48 |
| 2020/0019611 A1* | 1/2020 | Tutubalina | G06F 17/18 |
| 2020/0175119 A1* | 6/2020 | Chung | G06F 40/30 |
| 2020/0184017 A1* | 6/2020 | Batra | G06F 40/30 |
| 2020/0184339 A1* | 6/2020 | Li | G06N 3/0454 |
| 2020/0218780 A1* | 7/2020 | Mei | G06F 40/35 |
| 2020/0242444 A1* | 7/2020 | Zhang | G06N 3/08 |
| 2020/0242623 A1* | 7/2020 | Savir | G06Q 30/016 |
| 2020/0311205 A1* | 10/2020 | Buttner | G06F 40/30 |

OTHER PUBLICATIONS

Jin, M., Luo, X., Zhu, H., & Zhuo, H. H. (Jun. 2018). Combining deep learning and topic modeling for review understanding in context-aware recommendation. In Proceedings of the 2018 Conference of the North American Chapter of the Association for Computational Linguistics: Human Language Technologies, vol. 1 (Lo.*

Gupta, P., Chaudhary, Y., Buettner, F., & Schiitze, H. (2018). Texttovec: Deep contextualized neural autoregressive topic models of language with distributed compositional prior. arXiv preprint arXiv:1810.03947.*

Stanislas Lauly, Yin Zheng, Alexandre Allauzen, and Hugo Larochelle. 2016. Document neural autoregressive distribution estimation. arXiv preprint arXiv: 1603.05962.*

Ruslan Salakhutdinov and Geoffrey Hinton. Replicated softmax: an undirected topic model. In Proceedings of the Advances in Neural Information Processing Systems 22 (NIPS 2009), pp. 1607-1614. NIPS, 2009.; 2009;.

Pankaj Gupta, Subburam Rajaram, Hinrich Schutze, and Bernt Andrassy. Deep temporal-recurrentreplicated-softmax for topical trends overtime. In Proceedings of the 2018 Conference of the North American Chapter of the Association for Computational Linguistics: Human Language Technologies, vol. 1 (Long Papers), vol. 1, pp. 1079-1089, New Orleans, USA, 2018a. Association of Computational Linguistics.

Hugo Larochelle and Yoshua Bengio. Classification using discriminative restricted boltzmann machines. In Proceedings of the 25th international conference on Machine learning, pp. 536-543. ACM, 2008.

Matthew Peters, Mark Neumann, Mohit Iyyer, Matt Gardner, Christopher Clark, Kenton Lee, andLuke Zettlemoyer. Deep contextualized word representations. In Proceedings of the 2018 Conference of the North American Chapter of the Association for Computational Linguistics: Human Language Technologies, vol. 1 (Long Papers), pp. 2227-2237. Association for Computational Linguistics, 2018. URL http://aclweb.org/anthology/N18-1202.

Yoshua Bengio, R'ejean Ducharme, Pascal Vincent, and Christian Jauvin. A neural probabilistic language model. Journal of machine learning research, 3(Feb):1137-1155, 2003.

Hugo Larochelle and Stanislas Lauly. A neural autoregressive topic model. In Proceedings of the Advances in Neural Information Processing Systems 25 (NIPS 2012). NIPS, 2012.

Tomas Mikolov, Martin Karafiat, Lukas Burget, Jan Cernocky, and Sanjeev Khudanpur. Recurrent neural network based language model. In Eleventh Annual Conference of the International Speech Communication Association, 2010.

Rajarshi Das, Manzil Zaheer, and Chris Dyer. Gaussian lda fortopic models with word embeddings. In Proceedings of the 53rd Annual Meeting of the Association for Computational Linguistics and the 7th International Joint Conference on Natural Language Processing (vol. 1: Long Papers), vol. 1, pp. 795-804, 2015.

Mehran Sahami and Timothy D Heilman. A web-based kernel function for measuring the similarity of short text snippets. In Proceedings of the 15th international conference on World Wide Web, pp. 377-386. AcM, 2006.

Hanna M Wallach. Topic modeling: beyond bag-of-words. In Proceedings of the 23rd international conference on Machine learning, pp. 977-984. ACM, 2006.

Xuerui Wang, Andrew McCallum, and Xing Wei. Topical n-grams: Phrase and topic discovery, with an application to information retrieval. In icdm, pp. 697-702. IEEE, 2007.

Dat Quoc Nguyen, Richard Billingsley, Lan Du, and Mark Johnson. Improving topic models with latent feature word representations. Transactions of the Association for Computational Linguistics, 3:299-313, 2015.

Hugo Larochelle and Iain Murray. The neural autoregressive distribution estimator. In Proceedings of the Fourteenth International Conference on Artificial Intelligence and Statistics, pp. 29-37, 2011.

Yin Zheng, Yu-Jin Zhang, and Hugo Larochelle. A deep and autoregressive approach for topic modeling of multimodal data. In IEEE transactions on pattern analysis and machine intelligence, pp. 1056-1069. IEEE, 2016.

Geoffrey E. Hinton, Simon Osindero, and Yee Whye Teh. Afast learning algorithm for deep belief nets. Neural Computation, 18:1527-1554, 2006.

D. Biei, A. Ng, and M. Jordan. Latent Dirichlet Allocation, pp. 993-1022, 2003.; 2003.

Matthew Peters, Mark Neumann, Mohit Iyyer, Matt Gardner, Christopher Clark, Kenton Lee, and Luke Zettlemoyer. Deep contextualized word representations. In Proceedings ofthe 2018 Conference ofthe North American Chapter of the Association for Computational Linguistics: Human Language Technologies, vol. 1 (Long Papers), pp. 2227-2237. Association for Computational Linguistics, 2018. URL http://aclweb.org/anthology/N18-1202.

Stanislas Lauly, Yin Zheng, Alexandre Allauzen, and Hugo Larochelle. Document neural autoregressive distribution estimation. Journal of Machine Learning Research, 18(113):1-24, 2017. URL http://jmlr.org/papers/v18/16-017.html.

James Petterson, Wray Buntine, Shravan M Narayanamurthy, Tiberio S Caetano, and Alex J Smola. Word features for latent dirichlet allocation. In Advances in Neural Information Processing Systems, pp. 1921-1929, 2010.

Kamal Nigam, Andrew Kachites McCallum, Sebastian Thrun, and Tom Mitchell. Text classification from labeled and unlabeled documents using em. Machine learning, 39(2-3):103-134, 2000.

Jeffrey Pennington, Richard Socher, and Christopher D. Manning. Glove: Global vectors for word representation. In Proceedings of the 2014 Conference on Empirical Methods in Natural Language Processing, EMNLP 2014, Oct. 25-29, 2014, Doha, Qatar, A meeting of SIGDAT, a Special Interest Group of the ACL, pp. 1532-1543, 2014. URL http://aclweb.org/anthology/D/D14/D14-1162.pdf.

* cited by examiner

SYSTEM AND METHOD FOR NATURAL LANGUAGE PROCESSING WITH A MULTINOMINAL TOPIC MODEL

FIELD OF TECHNOLOGY

The present invention generally relates to a natural language processing system configured to receive an input sequence of input words representing a first sequence of words in a natural language of a first text and to generate an output sequence of output words representing a second sequence of words in a natural language of a second text.

BACKGROUND

Probabilistic topic models are often used to extract topics from text collections and predict the probabilities of each word in a given document belonging to each topic. Subsequently, such models learn latent document representations that can be used to perform natural language processing (NLP) tasks such as information retrieval (IR), document classification or summarization. However, such probabilistic topic models ignore the word order and represent a given context as a bag of its words, thereby disregarding semantic information. Examples for such probabilistic topic models are Latent Dirichlet Allocation (LDA) (Blei, Ng, and Jordan, 2003), Replicated Softmax (RSM) (Salakhutdinov & Hinton, 2009) and Document Neural Autoregressive Distribution Estimator (DocNADE) (Larochelle & Lauly, 2012; Zheng et al., 2016; Lauly et al., 2017).

An example of a completely different meaning of a word depending on the context and the word order is the word "bear" in the following two sentences:

Bear falls into market territory.

Market falls into bear territory.

When estimating the probability of a word in a given context such as "bear" in this example, traditional topic models do not account for the language structure since they ignore the word order within the context and are based on "bag-of-words" (BoWs) only. In this particular setting, the two sentences have the same unigram statistics, but are about different topics. On deciding which topic generated the word "bear" in the second sentence, the preceding words "market falls" make it more likely that it was generated by a topic that assigns a high probability to words related to stock market trading, where a "bear territory" is a colloquial expression in the domain. In addition, the language structure (e.g., syntax and semantics) is also ignored by traditional topic models. For instance, the word "bear" in the first sentence is a proper noun and subject while it is an object in the second. In practice, topic models also ignore functional words such as "into", which may not be appropriate in some scenarios.

Recently, Peters et al. (2018) have shown that a language model based on deep contextualized Long Short-Term Memory (LSTM-LM) is able to capture different language concepts in a layer-wise fashion, e.g., the lowest layer captures language syntax and the topmost layer captures semantics. However, in LSTM-LMs the probability of a word is a function of its sentence only and word occurrences are modelled in a fine granularity. Consequently, LSTM-LMs do not capture semantics at a document level.

Similarly, while bi-gram Latent Dirichlet Allocation (LDA) based topic models (Wallach, 2006; Wang et al., 2007) and n-gram based topic learning (Lauly et al., 2017) can capture word order in short contexts, they are unable to capture long term dependencies and language concepts. By contrast, the Document Neural Autoregressive Distribution Estimator (DocNADE) (Larochelle & Lauly, 2012) learns word occurrences across documents and provides a coarse granularity in the sense that the topic assigned to a given word occurrence equally depends on all the other words appearing in the same document.

However, since it is based on the Bag of Words (BoW) assumption all language structure is ignored. In language modeling, Mikolov et al. (2010) have shown that recurrent neural networks result in a significant reduction of perplexity over standard n-gram models.

Furthermore, there is a challenge in settings with short texts and few documents. Related work such as Sahami & Heilman (2006) employed web search results to improve the information in short texts and Petterson et al. (2010) introduced word similarity via thesauri and dictionaries into LDA. Das et al. (2015) and Nguyen et al. (2015) integrated word embeddings into LDA and Dirichlet Multinomial Mixture (DMM) (Nigam et al., 2000) models. However, these works are based on LDA-based models without considering language structure, e.g. word order.

Generative models are based on estimating the probability distribution of multidimensional data, implicitly requiring modeling of complex dependencies. Restricted Boltzmann Machine (RBM) (Hinton et al., 2006) and its variants (Larochelle and Bengio, 2008) are probabilistic undirected models of binary data. Replicated Softmax Model (RSM) (Salakhutdinov and Hinton, 2009) and its variants (Gupta et al., 2018b) are generalization of the RBM, that are used to model word counts. However, estimating the complex probability distribution of the underlying high-dimensional observations is intractable. To address this challenge, NADE (Larochelle & Murray, 2011) decomposes the joint distribution of binary observations into autoregressive conditional distributions, each modeled using a feed-forward network. Unlike for RBM/RSM, this leads to tractable gradients of the data negative log-likelihood.

As an extension of the Neural Autoregressive Topic Model (NADE) and RSM, the Document Neural Autoregressive Topic Model (DocNADE) (Larochelle & Lauly, 2012) models collections of documents as orderless sets of words (BoW approach), thereby disregarding any language structure. In other words, it is trained to learn word representations reflecting the underlying topics of the documents only, ignoring syntactical and semantic features as those encoded in word embeddings (Bengio et al., 2003; Mikolov et al., 2013; Pennington et al., 2014; Peters et al., 2018).

While this is a powerful approach for incorporating contextual information in particular for long texts and corpora with many documents, learning contextual information remains challenging in topic models with short texts and few documents, due to limited word co-occurrences or little context and significant words do not overlap in such short texts.

SUMMARY

It is therefore an object of the present invention to improve topic modelling for short-text and long-text documents, especially for providing a better estimation of the probability of a word in a given context of a text corpus.

According to a first aspect, the invention provides a language processing system configured for receiving an input sequence $c_i$ of input words ($v_1, v_2, \ldots v_N$) representing a first sequence of words in a natural language of a first text and generating an output sequence of output words ($\widehat{v_1}$, $\widehat{v_2}, \ldots \widehat{v_N}$) representing a second sequence of words in a natural language of a second text and modeled by a multinominal topic model, wherein the multinominal topic model is extended by an incorporation of language structures using a deep contextualized Long-Short-Term Memory model (LSTM-LM).

In a preferred embodiment the multinominal topic model is a neural autoregressive topic model (DocNADE) and the extended multinominal topic model is a ctx-DocNADE model.

Furthermore, in an advantageous embodiment the ctx-DocNADE model is extended by the incorporation of distributed compositional priors for generating a ctx-DocNADEe model.

Advantageously, the distributed composition priors are pre-trained word embeddings by LSTM-LM.

Preferably, a conditional probability of the word $v_i$ in ctx-DOCNADE or ctx-DocNADEe is a function of two hidden vectors: $h_i^{DN}(v_{<1})$ and $h_i^{LM}(c_i)$, stemming from the DocNADE-based and LSTM-based components of ctx-DocNADE, respectively:

$$h_i(v_{<i}) = h_i^{DN}(v_{<i}) + \lambda h_i^{LM}(c_i)$$

where $h_i^{DN}(v_{<j})$ is computed as:

$$h_i^{DN}(v_{<i}) = g(e + \Sigma_{k<i} W_{:,v_k})$$

and $\lambda$ is the mixture weight of the LM component, which can be optimized during training and based on the validation set and the second term $h_i^{LM}$ is a context-dependent representation and output of an LSTM layer at position i−1 over input sequence $c_i$, trained to predict the next word $v_i$.

In a further embodiment, the conditional distribution for each word $v_i$ is estimated by:

$$p(v_i = w | v_{<i}) = \frac{\exp(b_w + U_{w,:} h_i(v_{<i}))}{\Sigma_{w'} \exp(b_{w'} + U_{w',:} h_i(v_{<i}))}$$

In a preferred embodiment, the ctx-DocNADE model and the ctx-DocNADEe model are optimized to maximize the pseudo log likelihood, $\log p(v) \approx \Sigma_{i=1}^D \log p(v_i | v_{<i})$.

According to a second aspect, the invention provides a method for processing natural language in a neural system, comprising receiving an input sequence $c_i$ of input words ($v_1, v_2, \ldots v_N$) representing a first sequence of words in a natural language of a first text and generating an output sequence of output words ($\widehat{v_1}, \widehat{v_2}, \ldots \widehat{v_N}$) representing a second sequence of words in a natural language of a second text and modeled by a multinominal topic model, comprising the steps:
  extending (S010) the multinominal topic model by an incorporation of language structures, and
  using (S020) a deep contextualized Long-Short-Term Memory model (LSTM-LM).

In a preferred embodiment, the multinominal topic model is a neural autoregressive topic model (DocNADE) and the extended multinominal topic model is a ctx-DocNADE model.

Advantageously, the ctx-DocNADE model is extended by the incorporation of distributed compositional priors for generating a ctx-DocNADEe model.

Preferably, the distributed composition priors are pre-trained word embeddings by LSTM-LM.

In an advantageous embodiment, a conditional probability of the wordy, in ctx-DocNADE or ctx-DocNADEe is a function of two hidden vectors: $h_i^{DN}(v_{<j})$ and $h_i^{LM}(c_i)$, stemming from the DocNADE-based and LSTM-based components of ctx-DocNADE, respectively:

$$h_i(v_{<i}) = h_i^{DN}(v_{<i}) + \lambda h_i^{LM}(c_i)$$

where $h_i^{DN}(v_{<j})$ is computed as:

$$h_i^{DN}(v_{<i}) = g(e + \Sigma_{k<i} W_{:,v_k})$$

and $\lambda$ is the mixture weight of the LM component, which can be optimized during training and based on the validation set and the second term $h_i^{LM}$ is a context-dependent representation and output of an LSTM layer at position i−1 over input sequence $c_i$, trained to predict the next word $v_i$.

Furthermore, in a preferred embodiment, the conditional distribution for each word $v_i$ is estimated by:

$$p(v_i = w | v_{<i}) = \frac{\exp(b_w + U_{w,:} h_i(v_{<i}))}{\Sigma_{w'} \exp(b_{w'} + U_{w',:} h_i(v_{<i}))}$$

Preferably, the ctx-DocNADE model and the ctx-DocNADEe model are optimized to maximize the pseudo log likelihood, $\log p(v) \approx \Sigma_{i=1}^D \log p(v_i | v_{<i})$.

According to a third aspect, the invention provides a computer program product comprising executable program code configured to, when executed, perform the method according to the second aspect.

BRIEF DESCRIPTION

Figure 2:
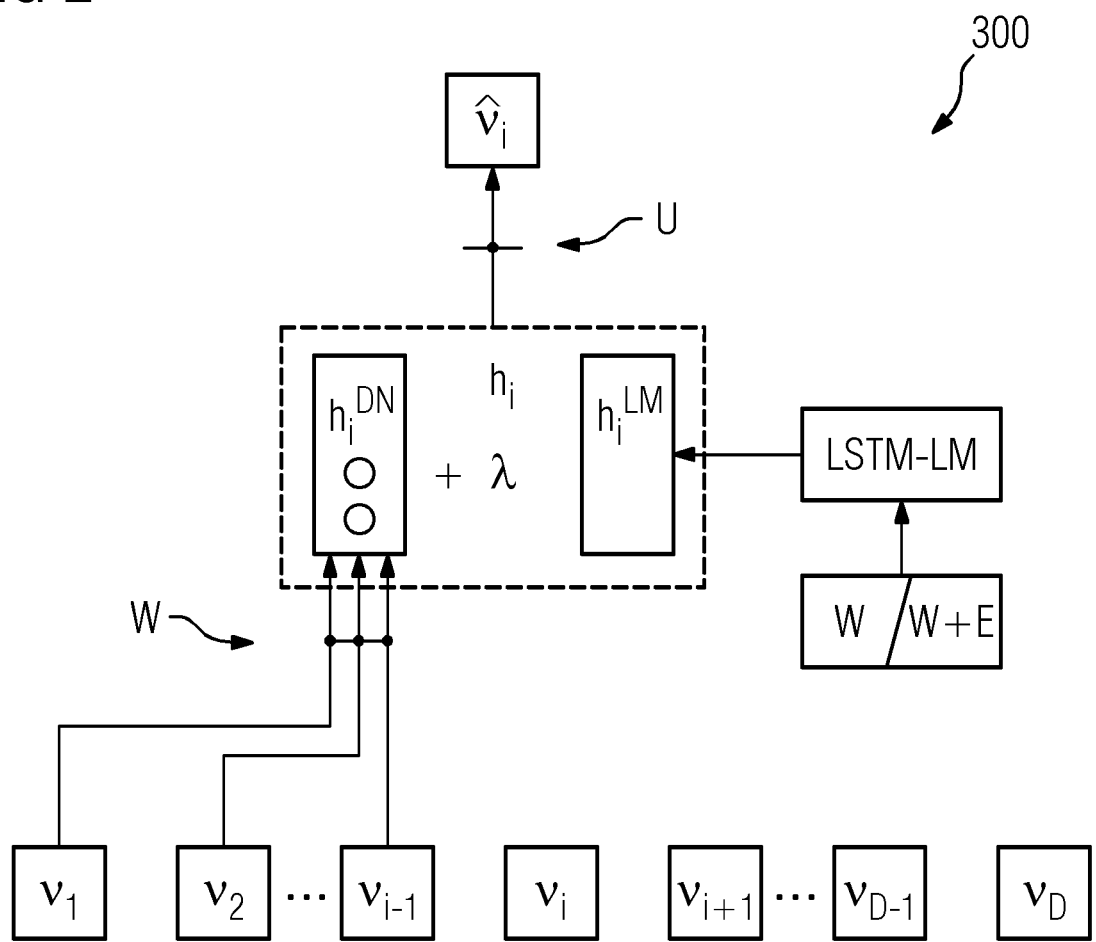
Figure 3:
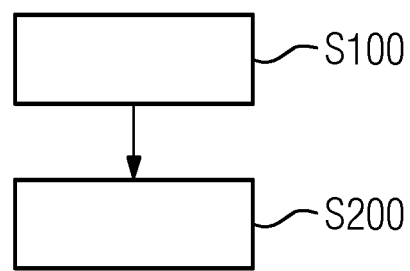
Figure 4:
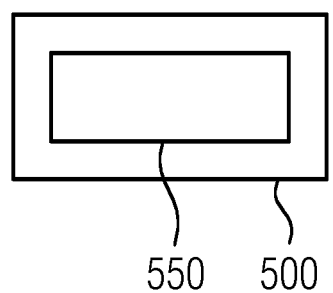

Additional features, aspects and advantages of the invention or of its embodiments will become apparent on reading the detailed description in conjunction with the following figures:

FIG. 1 provides a schematic overview of a DocNADE model;

FIG. 2 provides a schematic overview of a ctx-DocNADEe model;

FIG. 3 provides a schematic flow diagram illustrating an embodiment of a method according to the second aspect of the present invention;

FIG. 4 schematically illustrates a computer program product according to an embodiment of the third aspect of the invention.

DETAILED DESCRIPTION

In the following description, for purposes of explanation and not limitation, specific details are set forth in order to provide a thorough understanding of the present invention. It will be apparent to one skilled in the art that the present invention may be practiced in other implementations that depart from these specific details.

In FIG. 1 a DocNADE model 100 is illustrated according to the state of the art. DocNADE 100 is a generative neural autoregressive topic model to account for word counts, inspired by RSM and NADE. A document is represented by transforming its BoWs into a sequence $v = [v_1, \ldots, v_D]$ of size D, where each element $v_i \in \{1, 2, \ldots, K\}$ corresponds to a multinominal observation (representing a word from a vocabulary of size K). Thus, $v_i$ is the index in the vocabulary of the ith word of the document v. DocNADE models the joint distribution conditional p(v) of all words $v_i$ by decomposing it as $p(v) = \Pi_{i=1}^D p(v_i | v_{<i})$, where each autoregressive conditional $p(v_i | v_{<i})$ for the word observation $v_i$ is computed using the preceding observation $v_{<i} \in \{v_i, \ldots, v_{i-1}\}$ in a feed-forward neural network for $i \in \{1, \ldots, D\}$, $$h_i^{DN}(v_{<i}) = g\left(e + \sum_{k<i} W_{:,v_k}\right) \quad (1)$$

and $$p(v_i = w | v_{<i}) = \frac{\exp(b_w + U_{w,:}h_i^{DN}(v_{<i}))}{\sum_{w'}\exp(b_{w'} + U_{w',:}h_i^{DN}(v_{<i}))} \quad (2)$$

where g(x) is an activation function, $U \in \mathbb{R}^{K \times H}$ is a weight matrix connecting hidden units to output, $e \in \mathbb{R}^H$ and $b \in \mathbb{R}^K$ are bias vectors, $W \in \mathbb{R}^{H \times K}$ is a word representation matrix in which a column $W_{:,v_i}$ is a vector representation of the word $v_i$ in the vocabulary, and H is the number of hidden units (topics). The log-likelihood of any document v of any arbitrary length is given by: $\mathcal{L}^{DN}(v) = \sum_{i=1}^{D} \log p(v_i|v_{<i})$. The past word observations $v_{<i}$ are orderless due to BoWs and may not correspond to the words preceding the ith word in the document itself.

To predict the word $v_i$, each hidden layer $h_i$ takes as input the sequences of words $v_{>i}$ in the sequence.

In FIG. 2 a ctx-DocNADEe model 300 according to the present invention is illustrated.

According to the present invention, two extensions of the DocNADE model are proposed: a) incorporation of context information around words and b) incorporation of external knowledge for each word. Context information around words helps in determining their actual meaning. However, there is often a lack of context in short-text documents such as headlines, tweets, etc. or only a few documents are available. In case of a lack of context it is difficult to learn good representations and incoherent topics are generated. In order to solve this problem, external and/or additional information is used such as word embeddings which encode semantic and syntactic relatedness in words in a vector space.

In a first phase language structures are introduced into neural autoregressive topic models (DocNADE) via deep contextualized Long Short-Term Memory (LSTM-LM), thereby accounting for word ordering, syntactical and semantic features, language concepts and long-range dependencies. This allows the accurate prediction of words, where the probability of each word is a function of global and local contexts, modelled via DocNADE and LSTM-LM, respectively. The proposed neural topic model is named as contextualized-Document Neural Autoregressive Distribution Estimator (ctx-DocNADE) and offers learning complementary semantics by combining joint word and latent topic learning in a unified neural autoregressive framework.

While this is a powerful approach for incorporating language structure and word order in particular for long texts and corpora with many documents, learning from contextual information remains challenging in settings with short texts and few documents, due to limited word co-occurrences or little context significant words in such short texts. Furthermore, a small training corpus of documents leads to little evidence for learning word co-occurrences.

Therefore, in a second phase external knowledge for each word via pre-trained word embeddings E are introduced to model short and long texts. The unified network(s) account for the ordering of words, syntactical and semantic structures in a language, long and short term dependencies, as well as external knowledge, thereby circumventing the major drawbacks of BoW-based representations. This extension of ctx-DocNADE is called ctx-DocNADEe. By incorporation of distributed compositional priors (pre-trained word embeddings via LSTM-LM) in DocNADE the multinomial topic model (i.e., DocNADE) is supplemented in learning latent topic and textual representations on a smaller corpus and/or short texts. Knowing similarities in a distributed space and integrating this complementary information via a LSTM-LM, a topic representation is much more likely and coherent.

Similar to DocNADE, ctx-DocNADE models each document vas a sequence of minomial observations. Let $[v_1, v_2, \ldots, v_N]$ be a sequence of N words in a given document, where $v_i$ is represented by an embedding vector of dimension, dim. Further, for each element $v_i \epsilon v$, let $c_i=[v_1, v_2, \ldots, v_N]$ be the context (preceding word) of the ith word in the document. Unlike in DocNADE, the conditional probability of the word $v_i$ in ctx-DOCNADE (or ctx-DocNADEe) is a function of two hidden vectors: $h_i^{DN}(v_{<j})$ and $h_i^{LM}(c_i)$, stemming from the DocNADE-based and LSTM-based components of ctx-DocNADE, respectively:

$$h_i(v_{<i}) = h_i^{DN}(v_{<i}) + \lambda h_i^{LM}(c_i) \quad (3)$$

and $$p(v_i = w | v_{<i}) = \frac{\exp(b_w + U_{w,:}h_i(v_{<i}))}{\sum_{w'}\exp(b_{w'} + U_{w',:}h_i(v_{<i}))} \quad (4)$$

where hr (v<1) is computed as:

$$h_i^{DN}(v_{<i}) = g(e + \sum_{k<i} W_{:,v_k}) \quad (5)$$

and λ is the mixture weight of the LM component, which can be optimized during training (e.g. based on the validation set). The second term $h_i^{LM}$ is a context-dependent representation and output of an LSTM layer at position i−1 over input sequence $c_i$, trained to predict the next word $v_i$. The LSTM offers history for the ith word via modelling temporal dependencies in the input sequence $c_i$. The conditional distribution for each word $v_i$ is estimated by equation 4, where the unified network of DocNADE and LM combines global and context-dependent representations. The model according to the present invention is jointly optimized to maximize the pseudo log likelihood, $\log p(v) \approx \sum_{i=1}^{D} \log p(v_i|v_{<i})$.

In the weight matrix W of DocNADE, each row vector $W_{j,:}$ is a distribution over vocabulary of size K, representing the jth topic and each column vector $W_{:,v_i}$ is a vector for the word $v_1$. To obtain complementary semantics, this property is exploited and W is exposed to both global and local influences by sharing W in the DocNADE and LSTM-LS components. Thus, the embedding layer of the LSTM-LS component represents the column vectors.

In ctx-DocNADE the embedding layer in the LSTM component is randomly initialized. This extends DocNADE by accounting for the ordering of words and language concepts via context-dependent representations for each word in the document.

Ctx-DocNADEe extends ctx-DocNADE with distributional priors, where the embedding layer in the LSTM component is initialized by the sum of a pre-trained embedding matrix E and the weight matrix W, wherein W is a model parameter and E is a static prior.

In a third version or deep version, ctx-DeepDNEe, DocNADE and LSTM are extended to a deep, multiple hidden layer architecture by adding new hidden layers as in a regular deep feed-forward neural network, allowing for improved performance. In the deep version, the first hidden layer is computed in an analogous fashion to DocNADE variants. Subsequent hidden layers are computed as:

$$h_{i,d}^{DN}(v_{<1}) = g(e_d + W_{i,d} \cdot h_{i,d-1}(v_{<1})) \quad (6)$$

or $$h_{i,1}^{LM}(c_i) = \text{deepLSTM}(c_i, \text{depth}=d) \quad (7)$$

for d=2, . . . , n, where n is the total number of hidden layers (i.e. depth) in the deep feed-forward and LSTM networks. For d=1, the hidden vectors $h_{i,1}^{DN}$ and $h_{i,1}^{LM}$ correspond to equations 1 and 2. The conditional $p(v_i=w|v_{<1})$ is computed using the last layer n, i.e., $h_{i,n} = h_{i,n}^{DN} + \lambda h_{i,n}^{LM}$.

Algorithm 1 shows the log p(v) for a document v in three settings: DocNADE, ctx-DocNADE and ctx-DocNADEe.

---

Algorithm 1 Computation of log p(v)

Input: A training document v
Input: Word embedding matrix E
Output: log p(v)
  1. a ← e
  2. q(v) = 1
  3. For i from 1 to D do
  4. Compute $h_i$ and $p(v_i|v_{<i})$
  5. q(v) ← q(v)p($v_i|v_{<i}$)
  6. a ← a + $W_{:,v_i}$
  7. log p(v) ← log q(v)

---

Taken together, the advantages of complementary learning and external knowledge are combined, and topic- and language models with pre-trained word embeddings are coupled to model short and long text documents in a unified neural autoregressive framework, named as ctx-DocNADEe. By the approach according to the better textual representations can be learnt, which can be quantified via generalizability (e.g., perplexity), interpretability (e.g., topic extraction and coherence) and applicability (e.g., IR and classification).

The modeling approaches ctx-DocNADE and ctx-DocNADEe have been applied to 6 long-text and 8 short-text datasets from diverse domains and it could be demonstrated that the approach according to the present invention outperforms state-of-the-art generative topic models. By the learned representations a gain of 4.6% in topic coherence, 6.5% in precision at retrieval fraction, and 4.4% for text classification could be achieved.

Therefore, by the present invention two challenges of probabilistic topic modelling in order to better estimate the probability of a word in a given context are addressed. In a first phase language structure by combining a neural autoregressive topic model (TM) with a LSTM based language model (LSTM-LM) is incorporated in a single probabilistic framework. The LSTM-LM learns a vector-space representation of each word by accounting for word order in local collocation patterns, while the TM simultaneously learns a latent representation from the entire document. In addition, the LSTM-LM models complex characteristics of language (e.g., syntax and semantics), while the TM discovers the underlying thematic structure in a collection of documents. Therefore, by the present invention two complementary paradigms of learning the meaning of word occurrences are coupled by combining a topic model and a language model in a unified probabilistic framework, named as ctx-DocNADE.

However, in settings with a small number of word occurrences (i.e., lack of context) in short text or data sparsity in a corpus of few documents, the application of TMs is challenging. Therefore, in a second phase external knowledge is incorporated into neural autoregressive topic models via a language modelling approach. Word embeddings are used as input of a LSTM-LM with the aim to improve the word-topic mapping on a smaller and/or short-text corpus. The proposed DocNADE extension is named as ctx-DocNADEe. When applied to short-text and long-text documents, contextualized topic vectors are generated, which are named textTOvec.

The present invention comprises novel neural autoregressive topic model variants coupled with neural language models and embeddings priors that consistently outperform state-of-the-art generative topic models in terms of generalization (perplexity), interpretability (topic coherence) and applicability (retrieval and classification) over long-text and short-text datasets from diverse domains. Accounting for language concepts such as the ordering of words in neural autoregressive topic models helps to better estimate the probability of a word in a given context. A topic model (i.e., DocNADE) and a neural language model (e.g., LSTM) are combined in a single probabilistic framework. This facilitates learning a latent representation from the entire document whilst accounting for the word order in the collocation patterns. This complementary learning is extended with external knowledge by introducing word embeddings.

In FIG. 3 the processing steps of the method according to the present invention are illustrated. In step S100, the multinominal topic model is extended by an incorporation of language structures, and in step S200 a deep contextualized Long-Short-Term Memory model (LSTM-LM) is used.

FIG. 4 schematically illustrates a computer program product 500 comprising executable program code 550 configured to, when executed, perform the method according to the second aspect of the present invention.

The modeling approach according to the present invention can be used for textual representations encoding industrial documents, such as contract documents, service reports, etc. for industrial automation. The present invention can be used for automatic analysis, causality detection and recommendations such as replacement, inspection, repair, etc. by analyzing textual service reports. The encoded semantics via distributed document representations help in analyzing contract documents, can identify similarities in contract documents, topic assignment, topic extraction, text retrieval, etc.

The present invention can be used for artificial and deep learning frameworks and allows an expert or technician to interact and qualitatively analyze the machine learning systems to optimize/improve work flow, system output and further requirements.

The invention claimed is:

1. A natural language processing system comprising a processor, the processor configured for:
  receiving an input sequence $c_i$ of input words ($v_1$, $v_2$, . . . $v_N$) representing a first sequence of words in a natural language of a first text, and
  generating an output sequence of output words ($\widehat{v_1}, \widehat{v_2}, \ldots \widehat{v_N}$) representing a second sequence of words in a natural language of a second text using a multinominal topic model,
  wherein the multinominal topic model is extended by an incorporation of language structures using a deep contextualized Long-Short-Term Memory model,
  wherein the multinominal topic model is a document neural autoregressive topic model, DocNADE, and the extended multinominal topic model is a contextualized document neural autoregressive topic model, ctx-DocNADE, incorporating context information for the first sequence of words, and wherein the ctx-DocNADE model is extended by incorporation of distributed compositional priors for generating a ctx-DocNADEe model, incorporating external knowledge for each word of the first sequence of words.

2. The natural language processing system of claim 1, wherein the distributed composition priors are pre-trained word embeddings by LSTM-LM.

3. The natural language processing system of claim 1, wherein a conditional probability of the word $v_i$ in ctx-DocNADE or ctx-DocNADEe is a function of two hidden vectors: $h_i^{DN}$ ($v_{<i}$) and $h_i^{LM}$ ($c_i$), stemming from the DocNADE-based and LSTM-based components of ctx-DocNADE, respectively:

$$h_i(v_{<i}) = h_i^{DN}(v_{<i}) + \lambda h_i^{LM}(c_i)$$

where $h_i^{DN}(v_{<j})$ is computed as:

$$h_i^{DN}(v_{<i}) = g(e + \Sigma_{k<i} W_{:,v_k})$$

and λ is the mixture weight of the LM component, which can be optimized during training and based on the validation set and the second term $h_i^{LM}$ is a context-dependent representation and output of an LSTM layer at position i−1 over input sequence $c_i$, trained to predict the next word $v_i$.

4. The natural language processing system of claim 1, wherein the conditional distribution for each word $v_i$ is estimated by:

$$p(v_i = w | v_{<i}) = \frac{\exp(b_w + U_{w,:} h_i(v_{<i}))}{\Sigma_{w'} \exp(b_{w'} + U_{w',:} h_i(v_{<i}))}.$$

5. The natural language processing system of claim 1, wherein the ctx-DocNADE model and the ctx-DocNADEe model are optimized to maximize the pseudo log likelihood, $$\log p(v) \approx \Sigma_{i=1}^{D} \log p(v_i | v_{<i}).$$

6. The natural language processing system of claim 1, wherein the ctx-DocNADEe model and the ctx-DocNADE model are extended to a deep, multiple hidden layer architecture by adding new hidden layers as in a regular deep feed-forward neural network.

7. A computer-implemented method for processing an input sequence $c_i$ of input words ($v_1, v_2, \ldots v_N$) representing a first sequence of words in a natural language of a first text into an output sequence of output words ($\hat{v_1}, \hat{v_2}, \ldots \hat{v_N}$) representing a second sequence of words in a natural language of a second text using a multinominal topic model, comprising the steps:

extending the multinominal topic model by an incorporation of language structures, and using a deep contextualized Long-Short-Term Memory model, wherein the multinominal topic model is a document neural autoregressive topic model, DocNADE, and the extended multinominal topic model is a contextualized document neural autoregressive topic model, ctx-DocNADE, incorporating context information for the first sequence of words, and wherein the ctx-DocNADE model is extended by incorporation of distributed compositional priors for generating a ctx-DocNADEe model, incorporating external knowledge for each word of the first sequence of words.

8. The method of claim 7, wherein the distributed composition priors are pre-trained word embeddings by LSTM-LM.

9. The method of claim 7, wherein a conditional probability of the word $v_i$ in ctx-DocNADE or ctx-DocNADEe is a function of two hidden vectors: $h_i^{DN}$ ($v_{<j}$) and $h_i^{LM}$ ($c_i$), stemming from the DocNADE-based and LSTM-based components of ctx-DocNADE, respectively:

$$h_i(v_{<i}) = h_i^{DN}(v_{<i}) + \lambda h_i^{LM}(c_i)$$

where $h_i^{DN}$ ($v_{<j}$) is computed as:

$$h_i^{DN}(v_{<i}) = g(e + \Sigma_{k<i} W_{:,v_k})$$

and λ is the mixture weight of the LM component, which can be optimized during training and based on the validation set and the second term $h_i^{LM}$ is a context-dependent representation and output of an LSTM layer at position i−1 over input sequence $c_i$, trained to predict the next word $v_i$.

10. The method of claim 7, wherein the conditional distribution for each word $v_i$ is estimated by:

$$p(v_i = w | v_{<i}) = \frac{\exp(b_w + U_{w,:} h_i(v_{<i}))}{\Sigma_{w'} \exp(b_{w'} + U_{w',:} h_i(v_{<i}))}.$$

11. The method of claim 7, wherein the ctx-DocNADE model and the ctx-DocNADEe model are optimized to maximize the pseudo log likelihood, $$\log p(v) \approx \Sigma_{i=1}^{D} \log p(v_i | v_{<i}).$$

12. A non-transitory computer-readable data storage medium comprising executable program code configured to, when executed, perform the method according to claim 7.

13. The method of claim 7, wherein the ctx-DocNADEe model and the ctx-DocNADE model are extended to a deep, multiple hidden layer architecture by adding new hidden layers as in a regular deep feed-forward neural network.

* * * * *